United States Patent
Gans et al.

[11] Patent Number: 5,943,372
[45] Date of Patent: Aug. 24, 1999

[54] ORTHOGONAL POLARIZATION AND TIME VARYING OFFSETTING OF SIGNALS FOR DIGITAL DATA TRANSMISSION OR RECEPTION

[75] Inventors: Michael J. Gans, Holmdel; Vijitha Weerackody, Springfield; Jack Harriman Winters, Middletown, all of N.J.

[73] Assignee: Lucent Technologies, Inc., Holmdel, N.J.

[21] Appl. No.: 08/880,618

[22] Filed: Jun. 23, 1997

Related U.S. Application Data

[63] Continuation of application No. 08/685,112, Jul. 23, 1996, abandoned, which is a continuation of application No. 08/159,880, Nov. 30, 1993.

[51] Int. Cl.$^6$ .............................. H04B 7/10; H04L 1/10
[52] U.S. Cl. ..................... 375/347; 370/208; 455/506
[58] Field of Search ..................... 375/267, 347; 370/206, 208; 455/52.1, 52.3, 101, 107

[56] References Cited

U.S. PATENT DOCUMENTS

| | | | |
|---|---|---|---|
| 3,783,385 | 1/1974 | Dunn et al. | 375/40 |
| 3,882,393 | 5/1975 | Epstein | 455/52.1 |
| 4,383,332 | 5/1983 | Glance et al. | 375/40 |
| 4,490,830 | 12/1984 | Kai et al. | 375/40 |
| 4,521,878 | 6/1985 | Toyonaga | 375/40 |
| 4,601,046 | 7/1986 | Halpern et al. | 375/40 |
| 4,727,534 | 2/1988 | Debus, Jr. et al. | 370/20 |
| 4,905,084 | 2/1990 | Zucker | 358/141 |
| 5,280,631 | 1/1994 | Nakahi et al. | 455/101 |
| 5,305,353 | 4/1994 | Weerackody | 375/40 |
| 5,369,800 | 11/1994 | Takagi et al. | 455/101 |
| 5,377,035 | 12/1994 | Wang et al. | 455/101 |

OTHER PUBLICATIONS

Hiroike, "Combined Effects of Phase Sweeping Transmitter Diversity and Channel Coding", *IEEE Transactions on Vehicular Technology*, vol. 41, No. 2, May 1992.

Winters, J., "Optimum Combining in Digital Mobile Radio with Co–Channel Interference", reprinted from IEEE International Conference on Communications, ICC '83, Jun. 19–22, 1983, IEEE.

Iwai, A Fading Reduction Technique Using Interleave–Aided Open Loop Space Diversity for Digital Maritime–Satellite Communications, *IEICE Transactions*, vol. E 74, No. 10 Oct. 1991.

"Andrew Catalog 34", *Systems Planning Product Specifications Services*, p. 188, 190, 197.

*Primary Examiner*—Temesghen Ghebretinsae
*Attorney, Agent, or Firm*—Orrick, Herrington, Sutcliffe LLP

[57] ABSTRACT

A system for inducing rapid fading in wireless communication systems, such as digital radio and television transmission is described. Orthogonal polarization combined with time varying offsets are combined to insure rapid fading and result in improved signal reception.

5 Claims, 5 Drawing Sheets

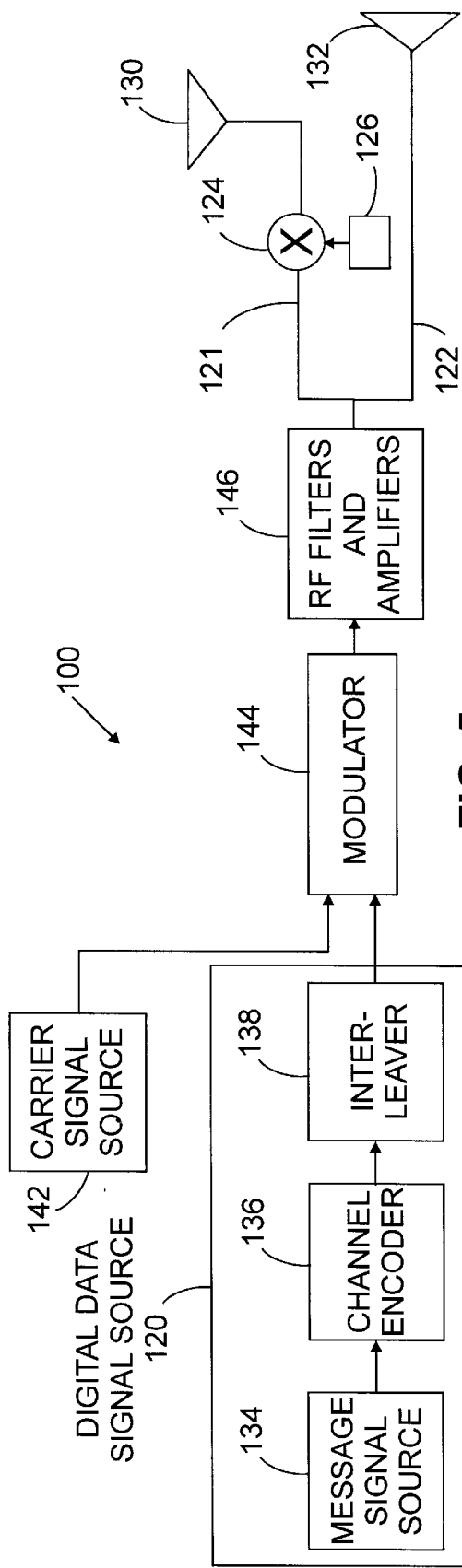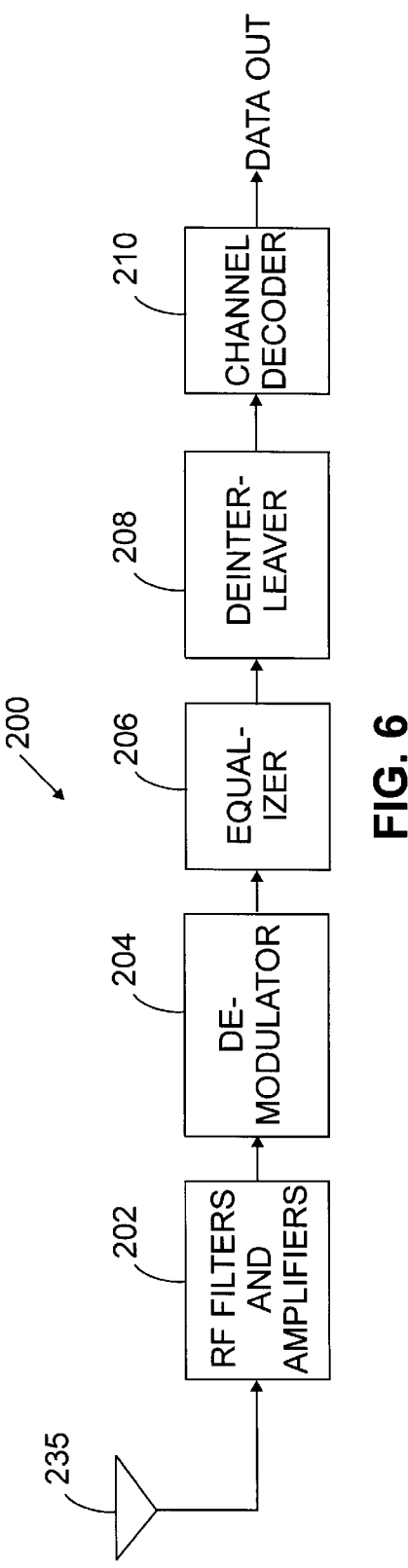

ORTHOGONAL POLARIZATION AND TIME VARYING OFFSETTING OF SIGNALS FOR DIGITAL DATA TRANSMISSION OR RECEPTION

This application is a continuation of application Ser. No. 08/685,112 filed on Jul. 23, 1996, now abandoned, which is a continuation of Ser. No. 08/159,880, filed on Nov. 30, 1993.

FIELD OF THE INVENTION

The present invention relates to the field of wireless data transmission and reception. More particularly it relates to inducing rapid fading characteristics and improving reception.

BACKGROUND OF THE INVENTION

In wireless communication systems, such as digital radio or television transmission, an information signal is communicated from a transmitter to a receiver as multiple signals via a channel comprising several independent paths. These multiple signals are called multipath signals and the channel is called a multipath channel. Because of the complex addition of multipath signals, the overall signal strength at a receiver will vary. The phenomenon of received signal strength variation due to complex addition of multipath signals is known as "fading".

A channel encoder (also known as a "channel coder") or similar device can be employed to compensate for fast fading. If the signal strength at a receiver "fades" slowly, however, a receiver experiencing a low signal strength, called a "deep fade", will observe a weak signal strength for a longer period of time than can be readily compensated for using a channel coder. Slow fading is a particular problem in car radio receivers.

Two types of channel coding systems are block coding and convolutional coding. Slow fading may cause a burst of incorrect data symbols at a data receiver. If the burst of incorrect data symbols is short enough the channel coder can detect or correct it. However, when fading is too slow, long bursts of errors can occur which cannot be adequately corrected and unacceptable performance results.

Interleaving/deinterleaving with a channel coder can be used to further combat slow fading. An interleaver at the transmitter rearranges a set of data symbols in a pseudorandom fashion and a deinterleaver at the receiver rearranges the symbols in the original order. However, interleaving/deinterleaving with a channel coder is not sufficient to combat fading if the deep fades last for long enough periods of time.

Spatial diversity can also be used to combat slow fading. Spatial diversity involves the use of a plurality of receiving and/or transmitting antennas. If two receiving antennas, for example, are spatially diverse from one another, the two signals received at the individual antennas will have independent fading characteristics and can be combined to reduce the probability of deep fades, independent of the fading rate.

Unfortunately, spatial diversity may require wide spacing of receiver antennas, typically at least a quarter wavelength. Thus, the receive antennas must be separated by at least 2.5 feet for audio broadcasting at 100 MHz, which is impossible to achieve in small portable receiving systems.

Spatial diversity may also be achieved using multiple transmit antennas. However, transmitting the same signal out of each transmit antenna is not useful, as it just generates more multipath signals at the receiver. One technique previously proposed is to use channel coding with interleaving/deinterleaving in combination with a time varying phase offset between each antenna as proposed in U.S. patent application, Ser. No. 07/890,977, filed on May 29, 1992 to Weerackody which is incorporated herein by reference. This time varying offset creates rapid fading at the receiver antenna, which can be compensated by channel coding with interleaving. For this technique to be effective, however, the signals received from the multiple transmit antennas must be independent. Unfortunately, in digital audio broadcasting (DAB) for example, the transmit antennas are usually very high, e.g., on top of the World Trade Center, to provide wide area coverage. At such heights spacing of tens of wavelengths between the transmit antennas is required to insure substantially independent fading. At 100 MHz with digital audio broadcasting, the required spacing is therefore in excess of hundreds of feet, which is not generally practical.

SUMMARY OF THE INVENTION

The present invention provides a technique for creating rapid fading at the receiver. In digital broadcasting, such as digital audio broadcasting, with rapidly varying fading, channel coding with interleaving is utilized to provide improved performance at the receiver. This addresses the problem presented by slow fading, as with a stationary or slow moving user, experiencing long periods of poor performance such as are typically observed with a slow fade. To create rapid fading, even for a slow-moving user, the signal is transmitted by two orthogonally polarized antennas with a slight time varying offset between the two antennas. Since existing broadcast antennas use orthogonally-polarized antennas, this technique can be easily implemented at the transmitter to overcome the above problem and provide satisfactory performance to all users.

As the reflection coefficient for most objects is polarization dependent, substantially independent fading from two orthogonally polarized antennas can be obtained. A time-varying phase offset, for example, between the antennas creates a time-varying transmit polarization resulting in time varying fading at the receiver. In one embodiment, the transmit polarization is continuously varied from left-hand circular to right-hand circular, two polarizations which have been shown to have high cross-polarization and low cross-correlation on reflection, resulting in substantially independent fading between the signals received at the times of extremes of the transmitted polarization. As most broadcast antennas use linear arrays to direct most of the transmitted energy downward and use two orthogonally-polarized arrays to increase transmitted power by 3 dB (with equal power to each of the polarizations), the technique requires only the addition of a time-varying phase offset, or shift between the orthogonally-polarized signals of standard antennas.

In another embodiment of the invention, more than two transmitting antennas are employed. At least one of said plurality of antennas transmits a signal which is substantially orthogonally polarized with respect to a signal transmitted from at least one other of said plurality of antennas, and a different time varying offset is applied to two or more of the plurality of substantially orthogonally polarized signals to result in fast fading which may be more readily compensated for.

In another embodiment, fast fading is achieved and slow fading is substantially eliminated by receiving a transmitted signal with a plurality of antennas. At least two of these antennas are arranged with respect to each other such that they receive substantially orthogonally polarized signals, and a different time varying offset, such as a time varying phase offset, is provided to one or more of the substantially orthogonally polarized received signals.

The present invention is preferably used in conjunction with interleaving and deinterleaving and channel coding. The present invention can also be used with other techniques such as spatial diversity to further reduce the effects of fading.

Further features of the invention, its nature and various advantages will be apparent from the drawings and the following detailed description of the invention.

BRIEF DESCRIPTION OF THE DRAWINGS

FIG. 5 shows a further transmitter section according to the present invention;

FIG. 6 shows a receiver section to be used with the FIG. 5 transmitter section of the present invention;

DETAILED DESCRIPTION OF THE INVENTION

Figure 1:
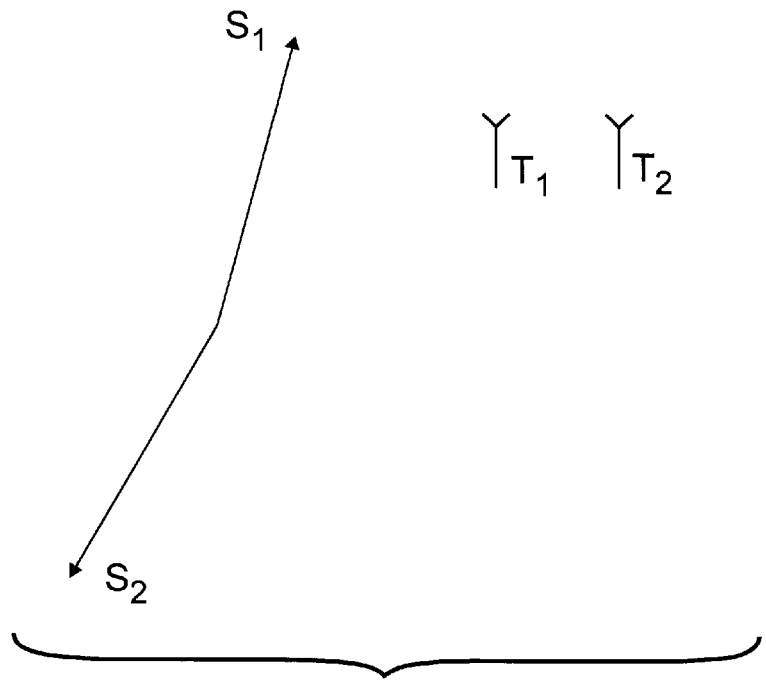
FIG. 1 illustrates a situation where a deep fade can occur.

FIG. 1 illustrates a situation where deep fading can occur. In this situation, phasors $S_1$ and $S_2$ represent the received signals from two transmitting antennas $T_1$ and $T_2$, respectively. In this situation, destructive addition of the phasors $S_1$ and $S_2$ results in a deep fade which can be compensated by the present invention.

Figure 2:
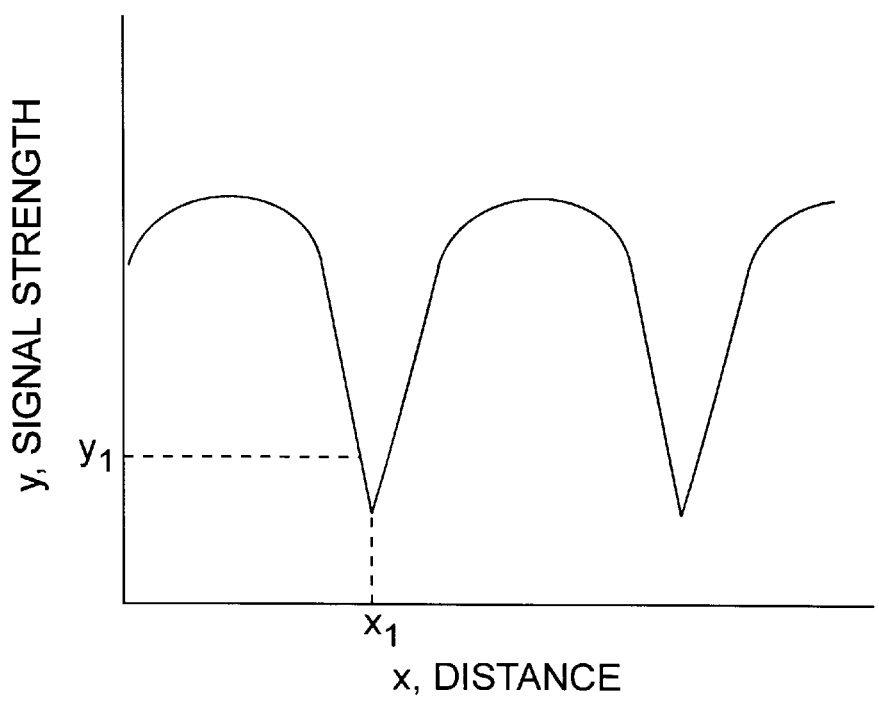
FIG. 2 is a graph of signal strength versus distance which illustrates fading for a single transmitting antenna and a single receiving antenna.

FIG. 2 is a graph of signal strength versus distance for a single transmitting and a single receiving antenna. It illustrates fading in a different way than FIG. 1. As shown in FIG. 2, the received signal strength y varies with the distance x of the receiver from the transmitter. At a distance $x_1$, the received signal is below a signal strength $y_1$, where signal strength $y_1$ is one below which data reception may be compromised. In the context of a digital audio broadcast being received by a car radio, if the car is moving slowly or is stopped at the distance $x_1$ from the transmitter, the deep fade may be observed for an unacceptably long time. Such fading may be characterized as slow fading. The present invention reduces the problems arising from slow fading by inducing rapid fading which may be suitably compensated for.

Figure 3:
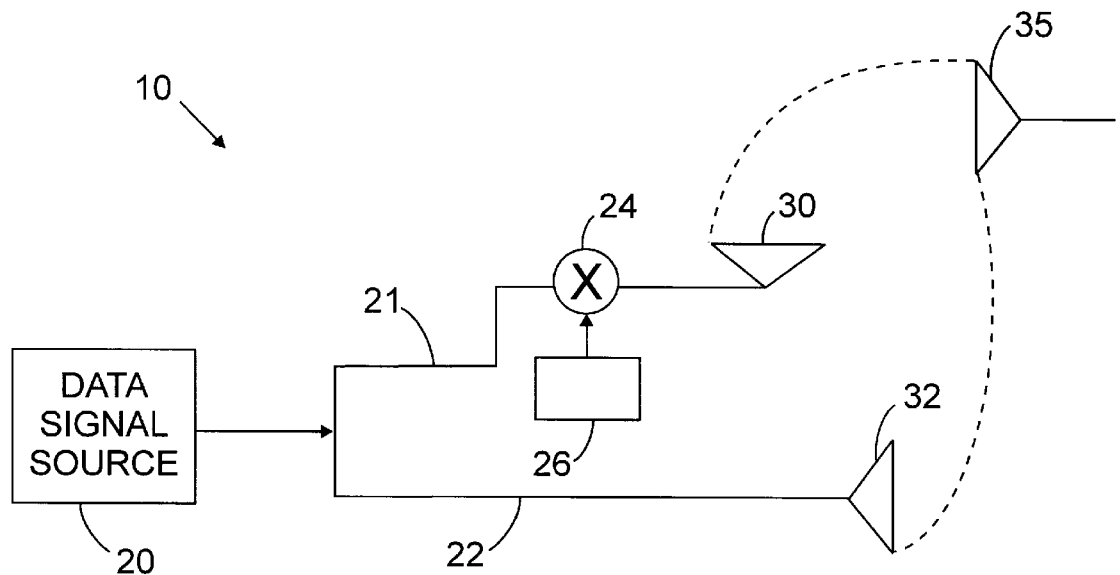
FIG. 3 shows a basic transmitter section illustrative of an embodiment of the present invention.

Referring to FIG. 3, a transmitter section 10 according to the present invention is shown. A receiving antenna 35 is also shown. The transmitter section 10 includes a data signal source 20, channels 21 and 22, and an oscillator 26, which applies a time varying phase offset, a mixer 24, and two transmitting antennas 30 and 32.

The data signal source 20 provides a data signal "D", such as a digital audio broadcast signal, to the inputs of both of the channels 21 and 22. The signal D is carried by the channels 21 and 22 to the antennas 30 and 32, respectively. The mixer 24 and oscillator 26 time vary the transmit phase of the signal transmitted from the antenna 30. The rate of variation of the antenna polarization should be about 1–2% of the data symbol rate. A time varying phase offset corresponding to a fixed frequency offset of about 1–2% of the data symbol rate may be used. Therefore, a time varying phase offset which results in a fixed frequency offset of about 3–6 kHz, for audio broadcasting may be used.

The antennas 30 and 32 are linear antennas which are configured to transmit substantially orthogonally polarized signals. Antenna 30 transmits a linearly polarized signal in the vertical plane, while antenna 32 transmits a linearly polarized signal in the horizontal plane. The receiving antenna 35 receives the combined transmitted signals, after transmission through multiple paths, and after modification by noise, delay, and distortion.

Figure 4:
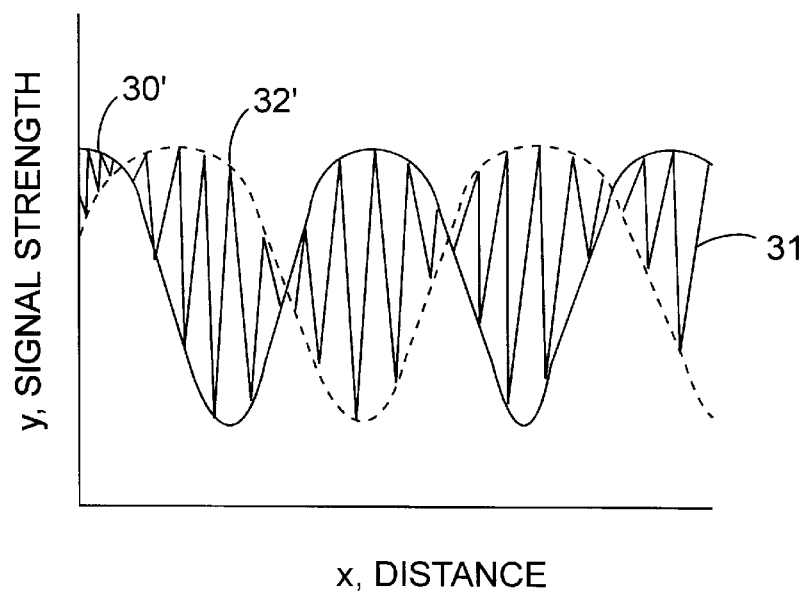
FIG. 4 is a graph of signal strength versus distance between transmitter and receiver when substantially orthogonally polarized signals and time varying offsets are used in accordance with the present invention.

FIG. 4 graphically illustrates the rapid fading characteristics created by the present invention. The solid envelope curve 30' shows the signal strength which might be observed at a receiver due to the signal transmitted from a single antenna 30. The dashed envelope curve 32' shows the signal strength which might be observed due to the signal transmitted from a single antenna 32. The curve 31 between the envelopes illustrates the resulting rapid fading signal which might be received by receiver 35 from transmitter 10 with the substantially orthogonally polarized signals transmitted from antennas 30 and 32 with time varying offset applied to the signal transmitted by antenna 30. It should be recognized that FIG. 4 is illustrative only and that the rapid fading signal curve 31 may at times exceed the bounds of the two single antenna signal envelopes 30', 32'. Furthermore, the signal strength will vary even at a fixed distance.

FIG. 5 shows a transmitter 100 according to the present invention. The transmitter 100 includes a digital signal source 120, which includes a message signal source 134, a channel encoder 136, and an interleaver 138. Transmitter 100 further includes a carrier signal source 142, a modulator 144 with first and second inputs, an RF filter and amplifier section 146, channel 121 which includes mixer 124 and oscillator 126, channel 122, and orthogonally polarized transmitting antennas 130 and 132.

Message signal source 134 provides a digital data signal $D_m$ to the channel encoder 136. Channel encoder 136 applies an error control coding technique to the signal $D_m$ (or a "channel coding" technique) and outputs a signal $D_e$.

The error control coding technique applied by channel encoder 136 may be block coding or convolutional coding. In the case of a typical digital audio broadcast system, the input data rate to the channel encoder is in the range of about 300 kbits/second. Typically, the interleaver is a block interleaver and the modulation scheme is 4-PSK. Additional induced channel variations are introduced by small carrier frequency offsets using mixer 124 and oscillator 126. Suppose $f_1$ is the carrier frequency transmitted from antenna 130. Then, $f_1=f_c+\Delta f$. In this case, $f_c$ is the carrier frequency of the signal transmitted by antenna 132 and $\Delta f$ is the frequency offset at transmitting antenna 130. This fixed frequency offset can be typically in the range of 1–2% of the data symbol rate. Smaller frequency offsets will not sufficiently decorrelate the data symbols at the input to the channel decoder (at the receiver). On the other hand, larger frequency offsets will make the demodulation and the equalization functions difficult. Alternatively, the frequency offset may be applied to the baseband data stream before it is sent to the RF unit and the antenna.

A 200 millisecond delay or duration for interleaving is an appropriate duration for digital audio broadcasting applications. The interleaver 138 is provided to rearrange the data of the signal $D_e$ in a pseudorandom fashion. The output of interleaver 138, a signal $D_i$, is provided as an input to the second input of the modulator 144. A second signal, carrier signal C, is provided as an input to the first input of modulator 144. A modulated carrier signal $C_m$ is produced at the output of the modulator 144.

The modulation technique used is preferably phase shift keying (PSK), although other modulation techniques such as amplitude shift keying (ASK) and frequency shift keying (FSK) can be used with a digital data source. The modulator can be coherent or employ differential encoding. Coherent modulation, such as PSK, is preferred because an equalizer is preferably used in the receiver. However, differential encoding such as differential phase shift keying can be used.

The signal $C_m$ is input to the RF filter and amplifier section 146. In section 146, filters shape the spectrum of modulated carrier signal $C_m$ and amplifiers increase the signal strength to an appropriate level for transmission. A filtered and amplified signal $C_f$ is produced at the output of the RF filter and amplifier section 146 and applied to the inputs of the two channels, 121 and 122. The signal $C_f$ is thus input to both antenna 132 and mixer 124. The oscillator 126 and mixer 124 apply a time varying phase offset, $Off_a(t)$ to the signal $C_f$ applied to an input of the mixer 124. The offset signal $C_a$ is the resultant output signal from the mixer 124. The signals $C_a$ and $C_f$ are applied for transmission to the antennas 130 and 132, respectively. In this embodiment, the antennas 130 and 132 are preferably helical antennas. With this arrangement, the antenna 130 transmits a right hand circularly polarized signal and antenna 132 transmits a left hand circularly polarized signal.

FIG. 6 illustrates a receiver section 200 which is suitable for use with the transmitter 100 of FIG. 5. The receiver section 200 includes a receiving antenna 235, an RF filter and amplifier section 202, a demodulator 204, an equalizer 206, a deinterleaver 208, and a channel decoder 210.

The antenna 235 receives a combined signal consisting of the addition of the signals $C_a$ and $C_f$, after their transmission through various multipaths, and after modification by noise, delay, and distortion. The received signal becomes the input of the RF filter and amplifier section 202. In section 202, RF filters reduce noise and amplifiers increase the received signal strength. The output of the RF filter and amplifier section 202 is then applied to the demodulator 204 which demodulates the signal. The output of demodulator 204 is applied to the equalizer 206 which helps to reduce any amplitude and delay distortion. Equalizer 206 in FIG. 6 can be a decision-feedback type. The output of equalizer 206 is applied to the deinterleaver 208 which is used to rearrange data symbols to undo the process of interleaving which occurred in the interleaver 138 in the transmitter 100. The output of the deinterleaver 208 is applied to a channel decoder 210 which derives the original data message signal, and produces that signal at its output.

Although a frequency offset has been illustrated in FIG. 5, time varying amplitude or other time-varying phase offsets can also be used. The time varying offsets may be continuous or may take on discrete values as a function of time. Time varying offsets can be applied by mechanically moving one of the antennas or preferably by circuits known in the art which electronically apply time varying phase or amplitude offsets to an input signal. For example, an input signal can be applied to first input of a mixer, such as mixer 124, whose second input is a low frequency signal from an oscillator, such as oscillator 126, as shown in FIG. 5. The low frequency signal applies a time varying phase offset (which in this case is the same as a fixed frequency offset) to the input signal.

The time varying offsets introduced to the transmitting antenna signals should not be large enough to cause erroneous data transmission. On the other hand, time diversity of fading improves with faster offsets at the transmit antennas. Preferably, the offsets vary at a rate which is between 1 to 2% of the data rate, for example, a 3–6 kHz rate for 300 ksymbols/sec DAB transmission system. This is small in comparison to the data rate but large enough to cause sufficient time diversity.

While there are a myriad of polarization schemes which would be known to those skilled in the art, it is preferred that antennas in accordance with the present invention be configured to create vertically/horizontally polarized or left/right hand circularly polarized signals. These polarizations create signals which have fading that is highly uncorrelated at the receive antennas.

A carrier signal source in accordance with the present invention preferably produces a sinusoidal signal and may operate at a frequency of about 100 MHz for applications such as FM digital audio broadcasting.

Figure 7:
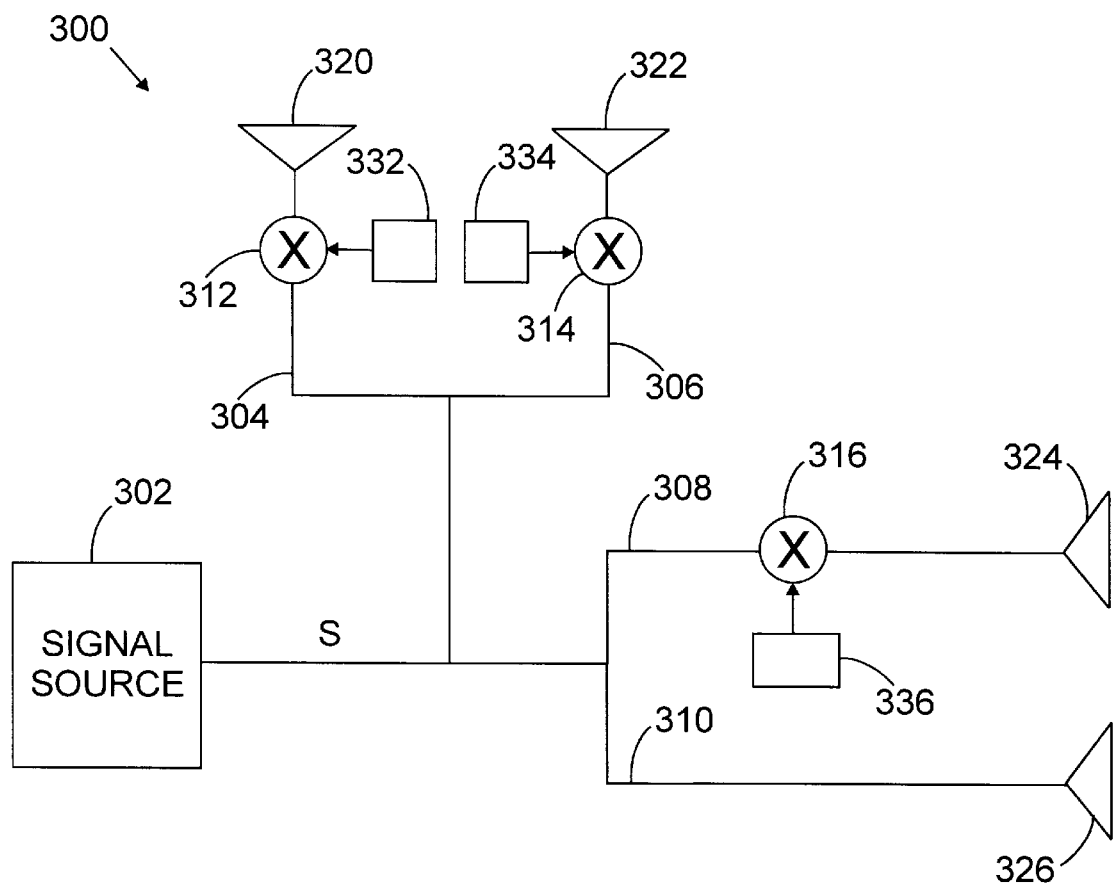
FIG. 7 shows a spatially diverse transmitter section in accordance with the present invention.

Referring to FIG. 7, a spatially diverse transmitter 300 is shown. The transmitter 300 includes a signal source 302, channels 304, 306, 308, and 310, mixers 312, 314, and 316, transmitting antennas 320, 322, 324, 326, and oscillators 332, 334, and 336.

A signal S is output from the signal source 302 and is applied to the inputs of each of the channels 304, 306, 308, and 310. Each channel but one includes an mixer which has an input connected to an oscillator. Each oscillator applies a different time varying phase offset through its corresponding mixer. Each oscillator frequency is different and each is independent of the signal from the respective channel. Offset signals are produced at the outputs of the mixers 312, 314, and 316, and are applied to the antennas 320, 322, and 324, respectively.

The antennas 320 and 322 are spatially diverse from each other to further reduce the effects of fading. The antennas 324 and 326 are similarly spatially diverse. Antennas 320 and 322 are preferably linear antennas which transmit signals with vertical polarization. Antennas 324 and 326 are preferably linear antennas which transmit signals with horizontal polarization.

The signal source 302 may have components corresponding to the message signal source 134, channel encoder 136, interleaver 138, carrier signal source 142, modulator 144, and RF filters and amplifier section 146, shown in FIG. 5.

Figure 8:
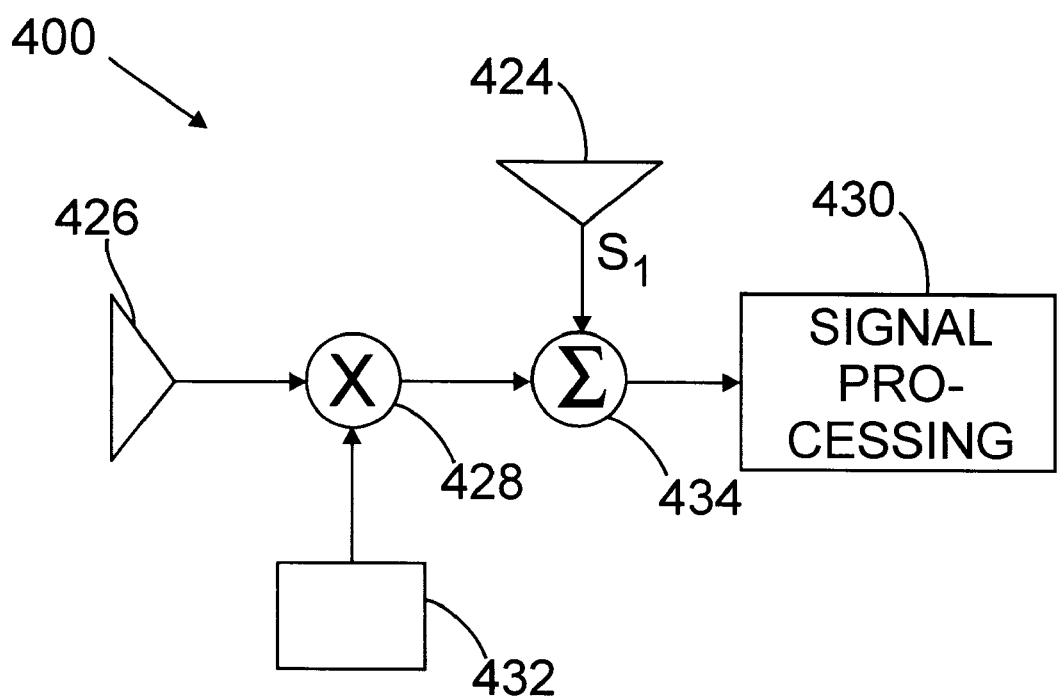
FIG. 8 shows a receiver section which includes two antennas for receiving two substantially orthogonally polarized signals in accordance with a further embodiment of the present invention.

Referring to FIG. 8, a receiver 400 according to the present invention is shown. The receiver 400 includes two receiving antennas, 424 and 426, mixer 428, an oscillator 432, a signal combiner 434, and a signal processing block 430.

The antennas 424 and 426 are preferably linear antennas. Antenna 424 transmits with vertical polarization and antenna 426 transmits with horizontal polarization. Mixer 428 and oscillator 432 apply a time varying phase offset to the signal received by the antenna 426. The signal processing block 430 may include elements corresponding to the RF filter and amplifier section 202, demodulator 204, equalizer 206, deinterleaver 208, and channel decoder 210, shown in FIG. 6.

While the benefits of orthogonal polarization with time varying offsets are particularly significant in the context of FM digital audio broadcasting and have been described above principally in that context, to provide transmit diversity of transmitting/receiving antennas in the present invention is also useful for other wireless transmission schemes, such as digital HDTV and the like.

We claim:

1. An apparatus for receiving data comprising a first receiving antenna having an input and an output, a second receiving antenna having an input and an output, said first and second receiving antennas arranged to receive signals at their inputs which are substantially orthogonally polarized with respect to one another, a first channel having an input and an output, said input connected to the output of the first receiving antenna, a second channel having an input and an output, said input connected to the output of the second receiving antenna, said second channel comprising an offset device for applying a time varying offset to a signal at the second channel's input to create a signal with a time varying offset at the second channel's output, said time varying offset being substantially independent of the signal at the second channel's input, a signal combiner having an output, and first and second inputs connected to the outputs of the first and second channels respectively, and signal processing means having an input connected to the output of the signal combiner.

2. The apparatus of claim 1 wherein the first receiving antenna is configured to receive a vertically polarized signal and the second receiving antenna is configured to receive a horizontally polarized signal.

3. The apparatus of claim 1 wherein the first receiving antenna is configured to receive a left hand circularly polarized signal and the second receiving antenna is configured to receive a right hand circularly polarized signal.

4. The apparatus of claim 1 wherein the signal processing means further comprises a decoder and a deinterleaver.

5. An apparatus for receiving data comprising a first receiving antenna having an input and an output, a second receiving antenna having an input and an output, said first and second receiving antennas arranged to receive signals at their inputs which are substantially orthogonally polarized with respect to one another, a first channel having an input and an output, said input connected to the output of the first receiving antenna, a second channel having an input and an output, said input connected to the output of the second receiving antenna, said second channel comprising an offset device for applying a periodic time varying offset to a signal at the second channel's input to create a signal with a periodic time varying offset at the second channel's output, a signal combiner having an output, and first and second inputs connected to the outputs of the first and second channels respectively, and signal processing means having an input connected to the output of the signal combiner.

* * * * *